Apr. 10, 1923.
C. W. ANDERSON
1,450,906
POWER CONTROL FOR SAW TABLES AND THE LIKE
Filed July 28, 1919 2 sheets-sheet 2
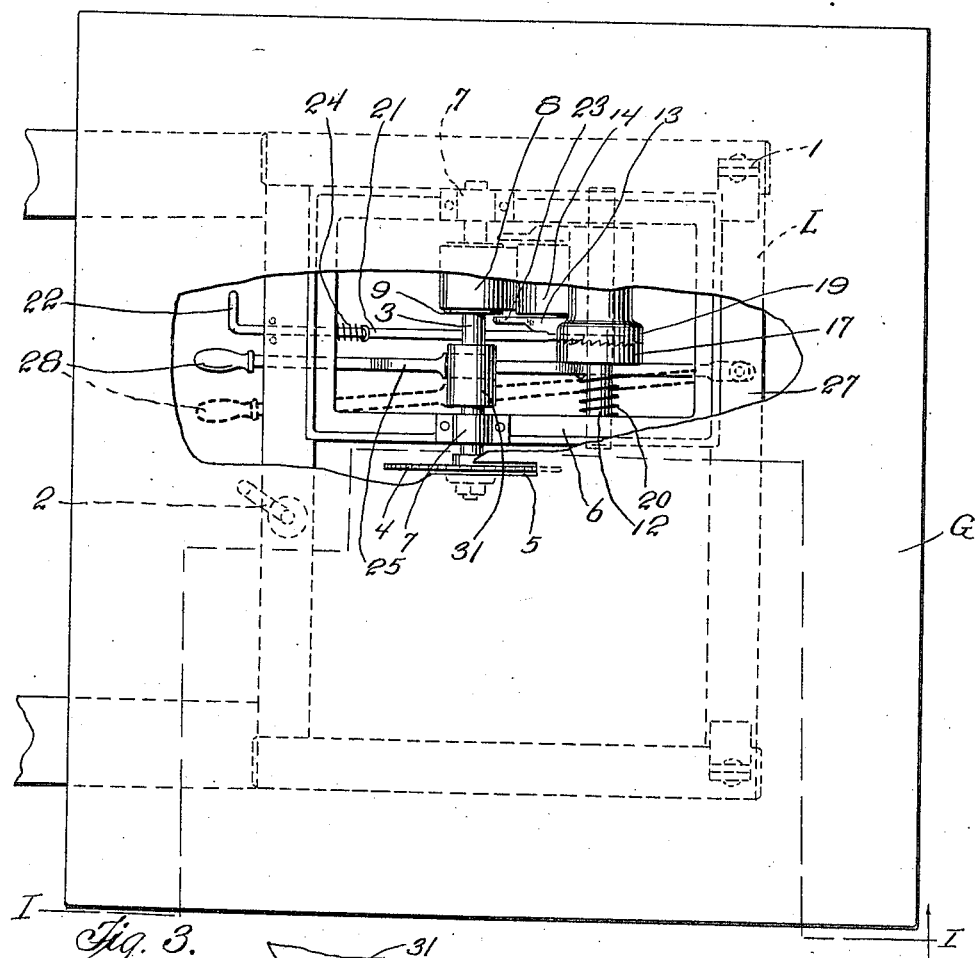
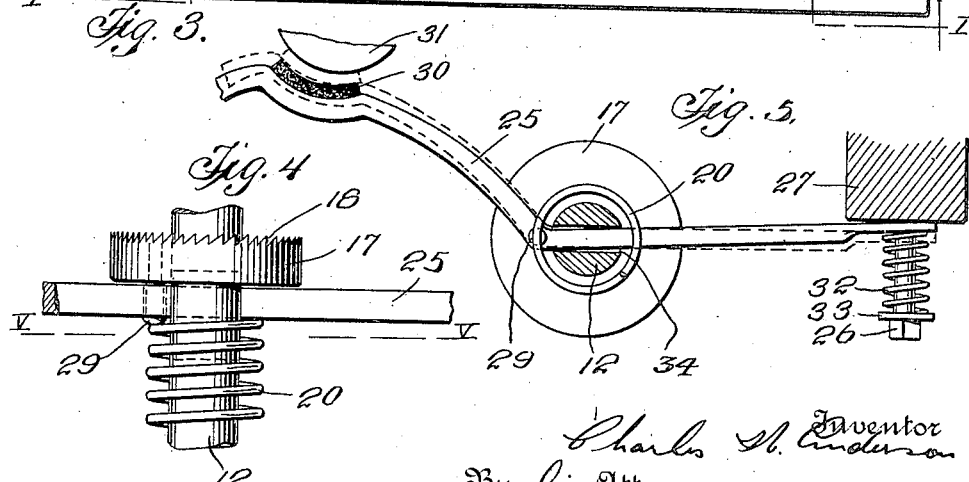
Inventor
Charles W. Anderson
By his Attorney Patented Apr. 10, 1923.

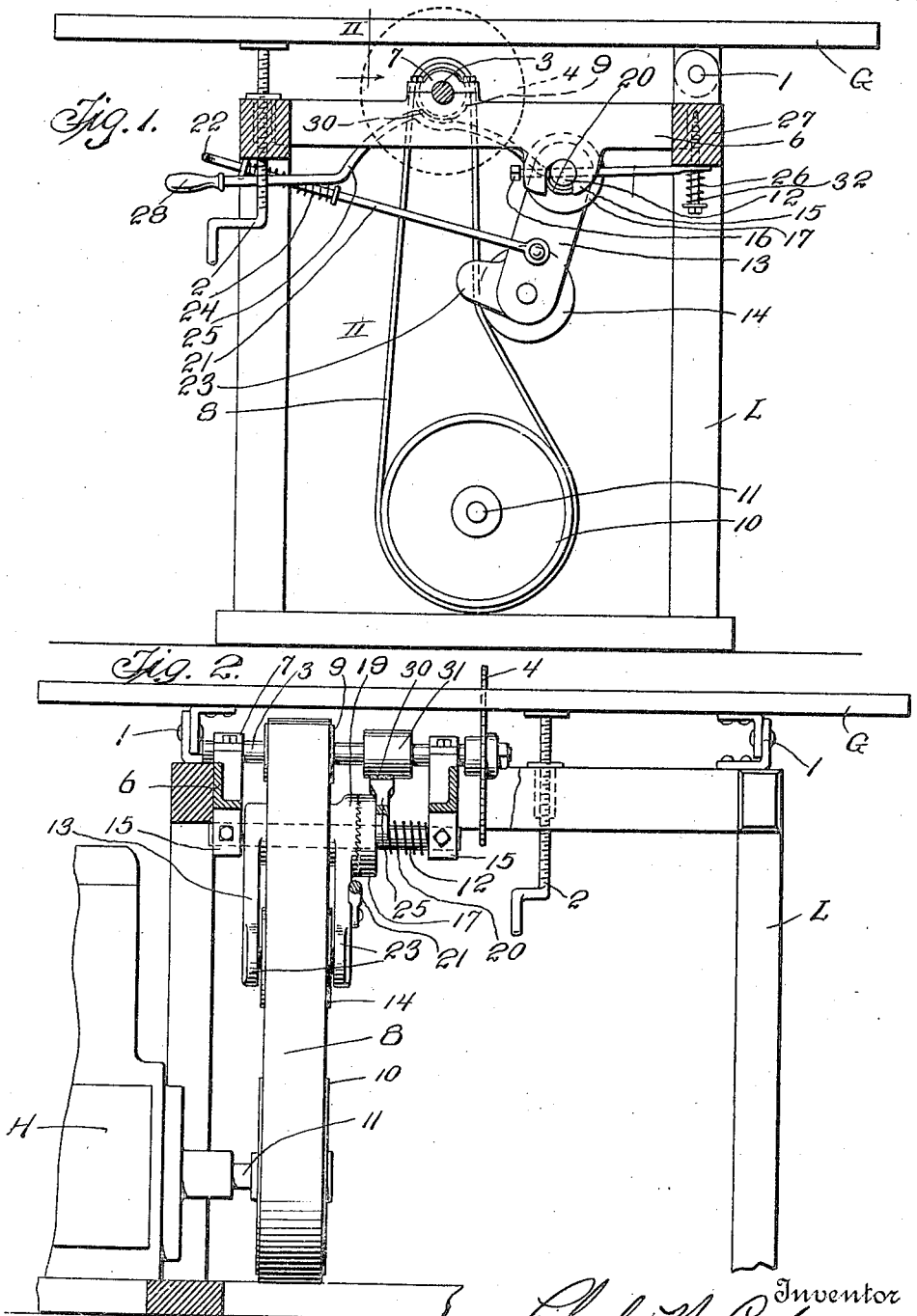

1,450,906

UNITED STATES PATENT OFFICE.

CHARLES W. ANDERSON, OF BROOKLYN, NEW YORK.

POWER CONTROL FOR SAW TABLES AND THE LIKE.

Application filed July 28, 1919. Serial No. 313,888.

*To all whom it may concern:*

Be it known that I, CHARLES W. ANDERSON, a citizen of the United States, residing at Brooklyn, in the county of Kings and State of New York, have invented certain new and useful Improvements in Power Control for Saw Tables and the like, of which the following is a specification.

This invention relates to an improvement in saw tables, and particularly to the drive mechanism for driving and controlling the saw.

An object of the invention is to provide simple and efficient means whereby the starting and stopping of the saw may be readily controlled.

A further object is to provide brake means for braking movement of the saw after the power has been disconnected.

A further object is to provide a manually operable element for disconnecting the power at will, the same element being also adapted for service as a brake.

A further and more detailed object is to provide a single control lever mounted to move in two directions for controlling the power connections and the brake respectively.

A further object is to provide in combination with a belt tightener device and means for manually moving the same into tightening position for completing driving connections for the saw, a single element manually operable for releasing the belt tightener and also for applying the brake.

Other objects and aims of the invention, more or less specific than those referred to above, will be in part obvious and in part pointed out in the course of the following description of the elements, combinations, arrangements of parts and applications of principles constituting the invention, and the scope of protection contemplated will be indicated in the appended claims.

In the accompanying drawings which are to be taken as a part of this specification, and in which I have shown merely a preferred form of embodiment of the invention:—

Figure 1 is a vertical transverse sectional view of a saw table constructed in accordance with this invention, the section being taken substantially upon the plane of line I—I of Fig. 3.

Fig. 2 is a similar sectional view taken substantially upon the plane of line II—II of Fig. 1.

Fig. 3 is a top plan view of the structure shown in Figs. 1 and 2, a portion of the table being broken away to disclose the construction of the saw control mechanism therebeneath.

Fig. 4 is an enlarged fragmentary detail view of a portion of the brake mechanism employed, and Fig. 5 is a similarly enlarged fragmentary sectional view of the brake mechanism, the section being taken substantially upon the plane of line V—V of Fig. 4.

Referring to the drawings for describing in detail the structure which is illustrated therein, the reference character L indicates a frame work above which is supported the saw table proper G, said table being connected with the frame L by suitable hinge members 1 and being adjustable about said hinges by means of a hand operable vertical screw 2, the hinges being at the rear of the table and the screw being at the front of the table.

A saw shaft 3 carries a saw 4 which projects thru a slot 5 in the table G so that a portion of the saw projecting above the table is adapted for use in the usual manner well known in this art, the proportion of the saw extending above the level of the table being determined by adjustment of the screw 2.

The shaft 3 is mounted in a metallic frame 6 which is supported in a horizontal position by the frame L and which provides suitable bearings 7 at its opposite sides for receiving the shaft 3.

The belt 8 hangs over a pulley 9 fixed to the shaft 3, and depends into the frame L and about a drive wheel 10 fixed to the shaft 11 of a suitable motor H.

The motor may be of any approved type, either an explosive engine or an electric motor, or otherwise, as desired, and it is intended to impart to the wheel 10 what may be here conveniently referred to as continuous rotation.

The belt 8 is normally loose so that the rotation of the wheel 10 does not rotate the saw shaft.

Mounted also upon the frame 6, and parallel with the shaft 3 is a second shaft 12. This shaft is non-rotatable and is intended primarily as the support for a carrying bracket 13 of an idler 14 forming parts of a belt tightener. The shaft 12 is held rigid in bearings 15 by means of set screws 16 and the bracket 13 is loosely mounted upon said shaft so that it normally swings to dispose its roller 14 away from the belt 8 in a manner as fully set forth heretofore in my pending applications Serial Nos. 161,343, filed April 11, 1917, 300,304 filed May 28, 1919, and 300,305, filed May 28, 1919, and in my Patent No. 1,267,345.

Fixed to slide upon the shaft 12, but held so as not to rotate thereon, is a clutch plate 17 having teeth 18 in one of its faces adapted to engage cooperative teeth in a clutch portion 19 formed upon the bracket 13 concentric with the shaft 12.

A spring 20 encircles a portion of the shaft 12 between the clutch plate 17 and the adjacent bracket 15 and serves normally to hold the two clutch parts 17 and 19 with their teeth in engagement with each other.

An operating rod 21 is fixed to the bracket 13 and extends to a position of accessibility at the front of the machine where it is provided with a handle as 22.

The bracket 13 is provided with extensions 23 at opposite sides of the roller 14 for guiding the belt 8.

The general construction and operation of the belt tightener is substantially as described in said pending applications; that is, that it may be placed in tightening position by the operator by simply drawing outwardly upon the rod 21 which action causes the teeth of the clutch member 19 to click past the teeth of the member 17 so that said teeth will hold the roller 14 substantially in the most forward position to which it is manually moved.

If the clutch plate 17 be thereafter forced along the shaft 12 out of engagement with the clutch member 19, the roller 14 will swing by gravity to non-tightening position and allow the shaft 3 to come to a stop notwithstanding continued rotation of the drive wheel 10.

If desired, the rod 21 may be furnished with a compression spring 24 for assisting in urging the roller 14 to, and holding said roller in, non-tightening position.

A hand lever 25 is provided for moving the plate 17 along the shaft 12. This lever is pivotally connected to swing in a horizontal plane about a pivot pin 26 projecting downwardly from the rear top rail member 27 of the frame L and the lever projects forwardly from this pivotal connection to the front side of the frame where it is fitted with a hand piece 28. At one point in its length the lever traverses a slot 34 formed longitudinally in the shaft 12 and is connected to the clutch plate 17 by means of a connecting pin 29. The connection afforded by the pin 29 is rather loose so as to readily accommodate the movements of the lever without causing the clutch plate to bind upon the shaft 12. Incidentally the connection afforded by the pin 29 serves as a convenient means for preventing rotation of the plate 17 about the shaft 12. The connection of the lever with the shaft 12 serves as a support cooperative with the member 27 for maintaining the handle end 28 of the lever in proper elevated position.

When it is desired to disconnect the clutch plate 17 from the member 19 it is simply necessary to swing the handle 28 laterally; that is, from the position shown in full lines to the position shown in dotted lines in Figure 3. The plate 17 will follow, by reason of the connection afforded by the pin 29, and the carrier 13 will fall out of belt tightening position.

After the driving connection between the drive pulley 10 and the driven pulley 9 is thus broken the momentum present in the rapidly revolving saw and its connected parts frequently will keep the saw revolving for an undesirable period of time. In these instances it is of advantage to apply a brake for overcoming the momentum referred to, and, as above suggested, it is a part of this invention to provide such a brake. A simple and efficient manner of accomplishing the braking action is as illustrated herein. The means illustrated includes mounting of the lever 25 so that in addition to its provision for lateral movement it is capable of vertical movement into and out of position for applying a brake portion thereof, as 30, in braking engagement with a drum 31 carried by the saw shaft 3. The braking portion 30 may consist of a portion of the lever 25 itself, or it may consist of a separately formed friction element carried by the lever, as may be desired.

In operating this brake, the operator, after having moved the handle 28 for disengaging the clutch 17 and 19, has simply to raise the handle 28 to press the portion 30 against the drum 31, as graphically illustrated in Fig. 5.

During this movement the lever 25 pivots within the slot 34 of the shaft 12 so that the rear end of the lever moves downwardly along the pin 26. The pin 26 is preferably fitted with a compression spring 32 engaging between a shoulder portion 33 of said pin and the under side of the adjacent portion of the lever 25 tending at all times to hold the rear end of the lever elevated so that the brake portion 30 is at the same time held away from engagement with the drum 31.

While the above description applies particularly to the application of certain features of this invention to a saw table, it is desired to be understood that these features of the invention may be applied to any other type of mechanism and are not necessarily restricted to use in connection with a saw table.

As many changes could be made in this construction without departing from the scope of the following claims, it is intended that all matter contained in the above description, or shown in the accompanying drawings, shall be interpreted as illustrative only and not in a limiting sense.

Having thus described my invention, what I claim as new and desire to secure by Letters Patent is:—

1. The combination with a drive pulley, a driven pulley, and connections between said two pulleys, of a single control lever movable for destroying said connections and for braking rotation of said driven pulley, a pair of pivotal supports for said lever engaging the lever at spaced points in the length thereof, one of said supports being of a character to provide for pivotal movement of the lever for destroying the mentioned connections, and the other of said supports being of a character to provide for pivotal movement of the lever for braking rotation of said driven pulley.

2. The combination with a drive pulley, a driven pulley, a slack belt extending between said pulleys, a belt tightener movable into and out of belt tightening position, a supporting shaft for the belt tightener, and a clutch member slidable upon said shaft operable to retain the belt tightener in belt tightening position, of a lever movable in one plane for sliding said clutch member into and out of retaining position, said lever being also of a character for braking rotation of the driven pulley, and said shaft constituting a pivotal mounting upon which the lever is adapted to swing in a different plane for braking the rotation of the driven pulley.

3. The combination with a drive pulley, a driven pulley and connections between said two pulleys, of a single control lever, means whereby said control lever is pivotally supported to swing in two planes, and means whereby swinging of said lever in one of said planes will render said connections inoperative while swinging of said lever in said other plane will brake rotation of the driven pulley.

4. The combination with a drive pulley, a driven pulley, a slack belt extending between said pulleys, a belt tightener movable into and out of belt tightening position, and means to hold said belt tightener in tightening position, of a hand operable member movable in two planes one for releasing the belt tightener and the other for braking rotation of the driven pulley.

5. The combination with a drive pulley, a driven pulley and connections between said pulleys, of a single control lever, a pair of pivotal supports for said control lever, one of said supports providing for pivotal swinging of the lever thereabout for rendering said connections inoperative, the other of said supports providing for pivotal swinging of the lever thereabout for braking rotation of the driven pulley, the first of said supports having associated therewith a resilient element operable upon the lever to hold the lever swung into non-braking position, and the second of said supports having associated therewith a resilient element operable upon the lever to resiliently oppose such swinging movement of the lever about the first support as would render the connections inoperative.

In testimony whereof I affix my signature in the presence of two witnesses.

CHARLES W. ANDERSON.

Witnesses:
L. GESSFORD HANDY,
MAY SCHULZ.